Dec. 14, 1948.                I. W. DOYLE                2,456,392
                        SEXTANT MARKING DEVICE
Filed Jan. 31, 1945                              5 Sheets-Sheet 1
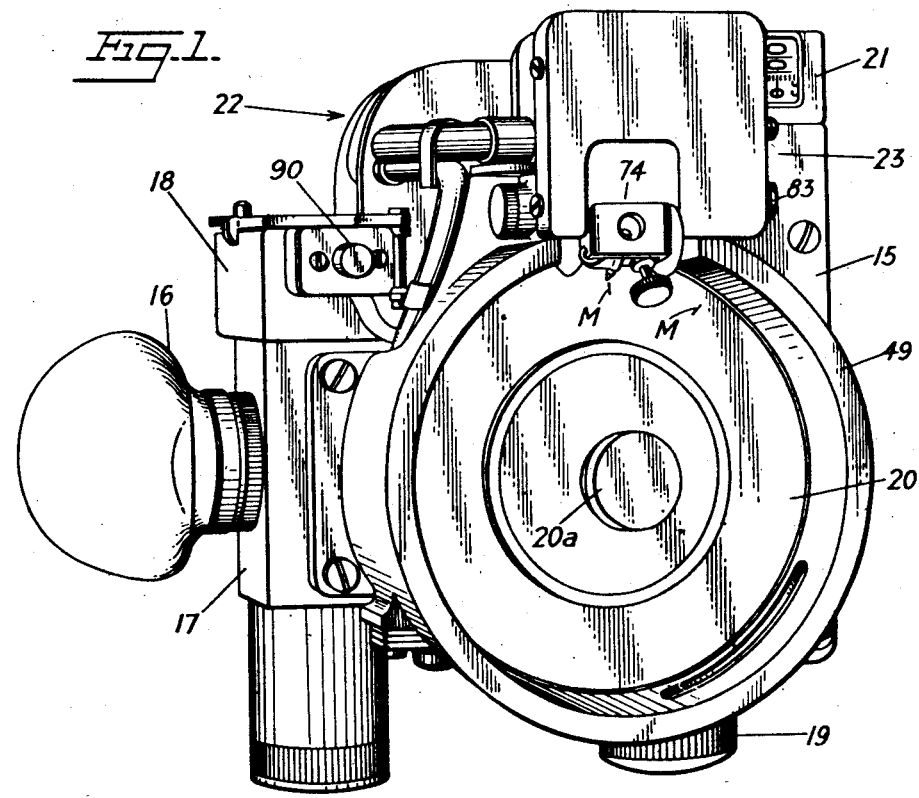
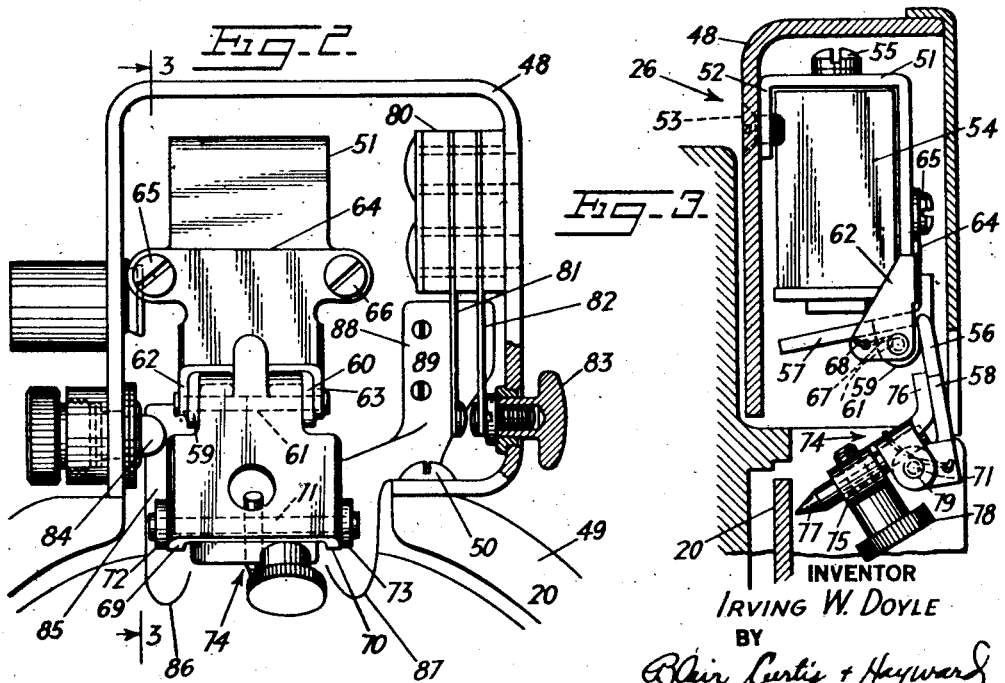
INVENTOR
IRVING W. DOYLE
BY
Blair, Curtis & Hayward
ATTORNEYS Dec. 14, 1948.  I. W. DOYLE  2,456,392
SEXTANT MARKING DEVICE
Filed Jan. 31, 1945  5 Sheets-Sheet 2

INVENTOR
IRVING W. DOYLE
BY
Blair, Curtis & Hayward
ATTORNEYS

Dec. 14, 1948. I. W. DOYLE 2,456,392
SEXTANT MARKING DEVICE
Filed Jan. 31, 1945 5 Sheets-Sheet 3
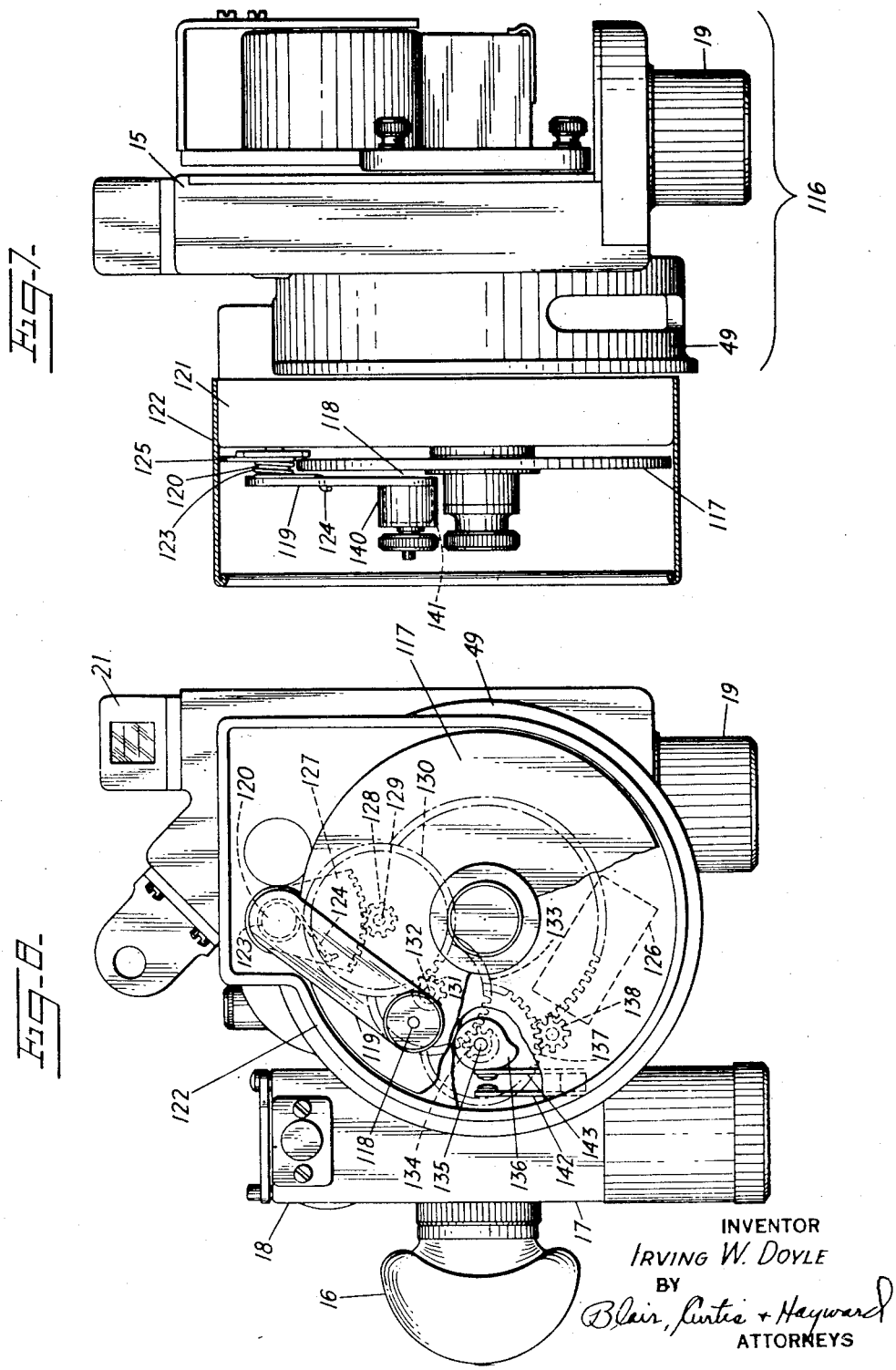
INVENTOR
*Irving W. Doyle*
BY
*Blair, Curtis + Hayward*
ATTORNEYS Dec. 14, 1948.   I. W. DOYLE   2,456,392
SEXTANT MARKING DEVICE Filed Jan. 31, 1945   5 Sheets-Sheet 4

INVENTOR
IRVING W. DOYLE
BY
Blair, Curtis + Hayward
ATTORNEYS

Dec. 14, 1948.  I. W. DOYLE  2,456,392
SEXTANT MARKING DEVICE

Filed Jan. 31, 1945  5 Sheets-Sheet 5

INVENTOR
IRVIN W. DOYLE
BY
Blair, Curtis + Hayward
ATTORNEYS

Patented Dec. 14, 1948

2,456,392

UNITED STATES PATENT OFFICE 2,456,392

SEXTANT MARKING DEVICE

Irving W. Doyle, Massapequa, N. Y., assignor to Fairchild Camera and Instrument Corporation, Jamaica, N. Y., a corporation of Delaware Application January 31, 1945, Serial No. 575,499

10 Claims. (Cl. 346—2)

This invention relates generally to sextants, and more particularly to an automatic marker for a sextant for averaging a substantial number of instantaneous sights to obtain an accurate reading or fix.

Due to the fact that the natural horizon is very difficult to see from an aircraft in flight, except at altitudes below 1,000 feet, an artificial horizon must be employed in an aircraft sextant. A spirit level, a pendulum or a vertical gyroscope might conceivably be used for this purpose. Gyros tend to accumulate errors over significant periods of time, and pendulums usually have excessive friction in their bearings, so most aircraft sextants employ spherical bubble levels to indicate the horizon.

Due to the effect of the accelerations of the aircraft upon the fluid in the bubble chamber, this form of artificial horizon is subject to instantaneous errors of large magnitudes. These errors, however, change their sign quite regularly, and if the average indication is taken reasonable accuracies can be obtained.

From studies made of the pitch, yaw and change of speed characteristics of many different types of aircraft, it has been found, particularly with respect to yaw, that the spirit level bubble reacts differently for different size aircraft. For a large aircraft, the oscillations resulting from yaw are of the order of 1.5 cycles per minute, whereas they are 3 to 4 cycles per minute in smaller aircraft. These oscillations of the aircraft probably result from the pilot's overcontrolling in one direction or the other as he endeavors to maintain his aircraft on its true compass course. Thus as he turns to starboard, for example, to return to his compass course, there is a reaction in the bubble chamber of the spirit level, i. e. by reason of the inertia of the liquid in the spirit level the bubble partakes of a characteristic oscillation which more or less follows the oscillation of the aircraft. Accordingly it follows that when the bubble is at the limits of its cycle of oscillation, the acceleration is greatest and accordingly the error is greatest. Hence to achieve an acceptable average observation, the individual sights must be made during all phases of at least one full cycle of the plane's oscillation. Therefore a certain minimum time must pass during the sighting period, and sights must be recorded at reasonably uniform intervals of time. A sighting period of from one to two minutes has been found to produce the best results. Longer periods produce errors attributable to fatigue of the operator.

When a navigator undertakes to perform this operation manually, he must hold constant collimation with the celestial body, and at equal intervals of time, record the sextant readings. This is done on a sextant of the type described hereinbelow by rotating with one hand the knob which moves the prisms while sights are recorded by manually pushing with the other hand a button which makes a record on a disc. The disc is geared to the prism mechanism so that the position of each mark indicates the prism position for each observation. By simple judgment or by counting to find the middle mark on the disc, either a weighted average or median average can be obtained.

Investigation of actual practice in the field shows that navigators cannot always maintain collimation to their satisfaction, and for this reason fail to record their sights at uniform intervals. This often results in more sights being taken when the bubble error is at a maximum than at a minimum. Further, some navigators record their sights only when relative motion between the bubble and the body is least. This technique results in large errors because the least relative motion occurs at the time when the bubble is most inaccurate; at the time when the acceleration is at maximum and the bubble is about to reverse its direction.

In order to avoid these natural psychological traits, it is necessary to take the determination of the instant of marking out of the control of the navigator and cause them to be automatically made at equal intervals of time. This leaves room for complete concentration on the part of the navigator upon continuous collimation. Thus the navigator may be taught to collimate anywhere in the field of view rather than only in the center. This technique is justified when it is realized that the deflection of the bubble is mainly caused by the acceleration of the plane and not by tilt of the aircraft or sextant. To correct, by tilting the sextant, a displacement of the bubble which is caused by acceleration, is to introduce still further error.

While different types of so-called averaging devices have been proposed, and indeed used to a certain extent, their averaging function was incapable of overcoming these difficulties. Certain types of sextants employed automatic averaging and marking mechanism which had a fixed time interval of operation, the arrangement being such as to necessitate the taking of successive readings throughout the entire period in order to obtain an average. When it is realized that in many instances readings cannot be taken for more than thirty seconds, for example, because of the celestial body's becoming obscured, or of the necessity of evasive action. It will be appreciated that if the averaging device had a total period of operation in excess of thirty seconds, an average could not be obtained. Still other mechanism of this character fail to take into consideration the human tendencies and proclivities of the observer, and accordingly could obtain indifferent averaging under conditions of normal use.

It is accordingly among the objects of my invention to provide an automatic average mechanism for a sextant of the artificial horizon type which is capable of obviating the above-noted difficulties in addition to others. It is a further object to provide mechanism of this nature which can be directly attached to the sextant without materially increasing the weight thereof, and without disturbing the normal operation thereof. Another object is to provide mechanism of the above nature which is simple and inexpensive in construction, and yet sufficiently durable under conditions of extended and hard use. A still further object is to provide mechanism of this character which, by reason of its simplicity and ease of operation, does not further complicate the normal use of the sextant. Other objects will be in part apparent and in part pointed out hereinafter.

The invention accordingly consists in the features of construction, combinations of elements, and arrangements of parts as will be exemplified in the structure to be hereinafter described, and the scope of the application of which will be indicated in the following claims.

In the drawing wherein I have shown different forms of my invention,

Figure 1 is a perspective view of a sextant of the artificial horizon type to which the preferred form of my automatic averaging and marking mechanism is attached;

Figure 2 is an enlarged elevation, partly in section, of the marking portion of the mechanism;

Figure 3 is a sectional elevation taken along the line 3—3 of Figure 2;

Figure 7 is an elevation, partly in section, showing a modified form of the automatic averaging mechanism;

Figure 8 is a side view of the sextant shown in Figure 7, a portion thereof being broken away;

Similar reference characters refer to similar parts throughout the various views of the drawing.

Figure 4:
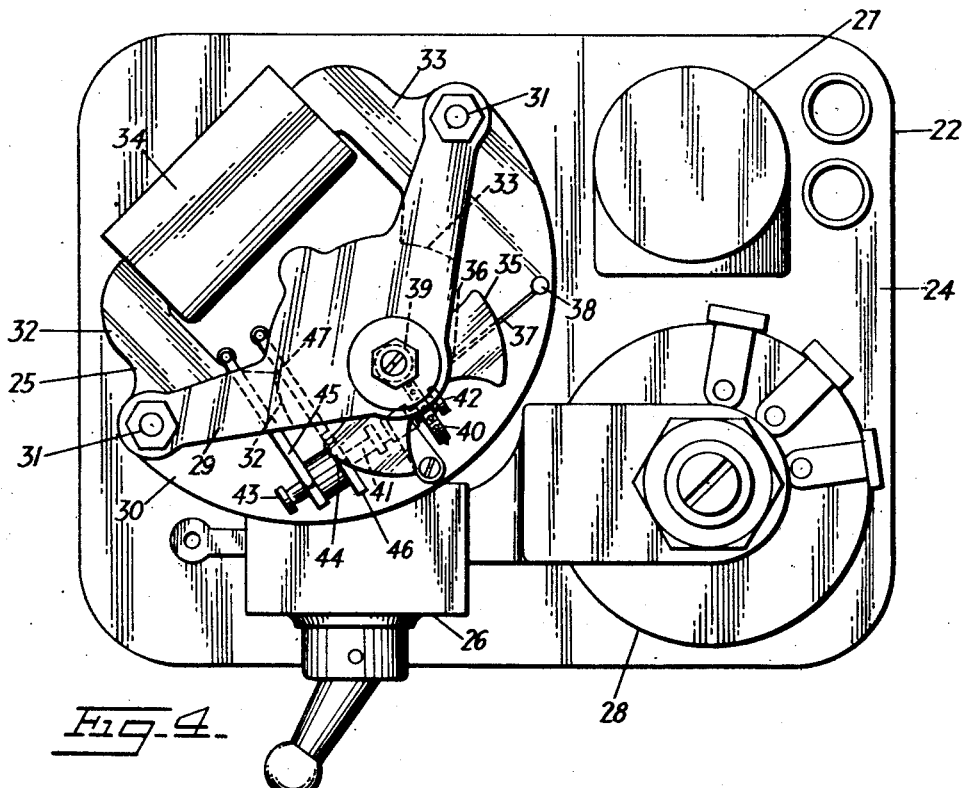
Figure 4 is an enlarged plan view of the electrically operated timing device employed in the mechanism, the cover being removed.

In Figure 1, I have shown a well-known type of bubble sextant, i. e. a sextant provided with an artificial horizon. In general this sextant comprises a body 15 which supports an optical system (not shown) part of which is an eyepiece 16. The eyepiece is mounted on a housing 17 carried by body 15 which houses the optical system of a liquid level 18. The sextant is operated by means of a knurled knob 19, this knob being geared to the movable portions of the optical system, as well as to an oscillatable record disc 20. Knob 19 also operates an indicator 21 from which both instantaneous and averaged readings may be taken.

Also attached to sextant body 15 is a timing system, generally indicated at 22, and a marking device generally indicated at 23 which is operated by the timing device to make successive marks on disc 20 at regularly spaced time intervals.

As is more clearly shown in Figure 4, the timing device 22 comprises a base or support plate 24, to which are attached an electric clock movement 25, an on-off switch 26 for a light, which will be described, a relay 27 and a rheostat 28 for controlling the intensity of illumination of another light, which will be described. Clock movement 25 includes upper and lower supporting plates 29 and 30 which are held in spaced relation by posts and nuts 31. Also secured to these posts are poles 32 and 33 in the general form of a U, the base of which extends through a coil 34. Movement 25 also includes a flywheel 35 whose shaft (not shown) is pivotally mounted between suitable bearings carried by supports 29 and 30, respectively, a conventional hair spring (not shown) being fastened in the usual manner to the flywheel shaft. Flywheel 35 is adapted, upon energization of coil 34, to oscillate back and forth. As it passes through the central point of its oscillation, a pin 36 extending downwardly from the flywheel disengages a contact spring 37, which is fastened to a post 38 extending upwardly from bottom support 30. When pin 36 touches contact spring 37, coil 34 is momentarily energized to produce a magnetism in the poles 32 and 33. Since flywheel 35 is cut away in substantially the shape shown in Figure 4, this momentarily produced magnetism attracts the protruding portion of the flywheel, giving the oscillating mechanism an impulse. The motion of the flywheel is such that the pin 36 sweeps by and disengages contact spring 37, opening the circuit as the flywheel poles approach the fixed poles 32 and 33 in either direction of operation, but before the poles actually reach the center point. The hair spring returns the flywheel to the point where contacts 36 and 37 reengage, thus completing one cycle and starting the next. This combination of the flywheel and its associated parts, i. e. the hair spring (not shown), pin 36 and contact spring 37, provides a movement having a fixed frequency of operation regardless of voltage or temperature variations.

Fastened to the shaft of flywheel 35 is a worm-shaped cam 39 which coacts with a toothed wheel 40 in such a manner that the cam indexes the wheel one tooth for each oscillation of the flywheel. Toothed wheel 40 is mounted on a shaft 41, the opposite ends of which are supported respectively in bearings 42 and 43, which are fastened to bottom support 30 and extend upwardly therefrom. Mounted on shaft 31, so as to be rotated thereby, is a contact drum 44 which is brushed at one end by a contact strip 45. The other end of the drum carries a star wheel 46 or the like, the points of which intermittently engage a contact strip 47 thereby electrically connecting strips 46 and 47 through the drum.

As will be pointed out hereinafter, contact strips 45 and 47 are electrically connected to relay 27 so that when contact strip 47 engages one of the points of star wheel 46, a circuit, including a source of power, as well as relay 27, is closed, thus energizing the relay. Energization of the relay in turn closes the circuit to marker 23 (Figure 1) causing a mark to be made on disc 20. It may now be seen that as long as coil 34 (Figure 4) of the timer is energized, the timer will create successive accurately timed impulses for operating the marker.

While timer 22 has been described as, and indeed preferably is, an electrically energizable device, my invention should not be so specifically limited, as under various circumstances the intermittent impulses or signals transmitted by the timer may be as accurately and effectively transmitted by the operation of a simple clockwork mechanism deriving its energy from a spring.

Referring now to Figures 2 and 3, marker 23 is housed in a case 48 which is fastened to the protecting rim 49 (see also Figure 1) of disc 20, as by a screw 50 (Figure 2). An inverted L-shaped bracket 51 (Figure 3) has its shorter leg 52 attached to the back of case 48 by screws 53, a solenoid coil 54 being attached to the bracket by means of a screw 55. A solenoid armature, generally indicated at 56, is right angular in shape, including an armature portion 57 and a stylus support 58. Armature 56 also includes a pair of lips 59 and 60 (Figure 2) through which extends a pin 61, the outer ends of which are carried in the ears 62 and 63 of a bracket 64 fastened to bracket 51, as by screws 65 and 66. A spring 67 (Figure 3) is coiled about pin 61, having one end bearing against the armature, and its other end 68 extending through a hole in bracket ear 62 so as to keep the armature under a constant counterclockwise bias, urging the armature portion 57 away from coil 54.

The lower end of stylus support 58 has formed at right angles thereto a pair of ears 69 and 70, which carry a pin 71. On the opposite ends of pin 71 are supported the ears 72 and 73 of a stylus generally indicated at 74, comprising a lead holder 75 and a tail piece 76 which abutting against stylus support 58 limits clockwise movement of the stylus. A lead 77 is adjustably carried in stylus 74 and may be set at various positions by manipulation of a thumb screw 78. A spring 79 coiled about pin 71 biases stylus 74 clockwise, tending to maintain tail piece 76 and stylus support 58 in engagement.

When solenoid coil 54 is energized, as occurs every time an impulse is created by timer 22 (Figure 4), armature 56 is pivoted clockwise, as viewed in Figure 3, forcing stylus lead 77 against the face of disc 20 to make a short radial mark thereon. Upon deenergization of coil 54, at the end of the impulse, spring 67 returns the armature to the position shown, withdrawing the stylus from disc 20. It may now be seen that every time an impulse is created by the timing mechanism described, a mark is made on disc 20. The impulse is of such short duration, however, that the marks, such as marks M (Figure 1) are substantially radial in spite of the fact that the disc may be rotating in one direction or the other, at the time the mark is made.

Referring to Figure 2, marker casing 48 has fastened thereto insulating blocks 80 to which are fastened stationary and movable contacts 81 and 82, respectively. Movable contact 82 has its free end attached to or abutting a push button 83 extending through a conveniently accessible portion of casing 48 for operation by the observer. Engagement of contacts 81 and 82, upon depression of push button 83, closes the circuit to the timer, causing the creation and transmission of accurately timed successive impulses to the marker, which accordingly makes a succession of marks on disc 20 at accurately spaced intervals of predetermined amount.

To facilitate use of the sextant and its associated averaging marker at night, a small electric light 84 is carried by the marker housing 48 (see Figure 2). The light extends into the casing adjacent a light conductor and distributor 85. Distributor 85 is formed of a clear, transparent plastic material having the property of light conductivity. Distributor 85 includes a pair of feet 86 and 87, and also an attaching arm 88 by which the light distributor is fastened as by screws 89 to the wall of casing 48. Feet 86 and 87 straddle stylus 74 and extend inwardly over the edge of disc 20 so that when light bulb 84 is energized, light rays emanating therefrom are conducted by the light distributor into the disc housing, thereby to illuminate the upper portion of the disc. The light is also conducted by feet 86 and 87 along opposite sides of stylus 74, and as the illumination on both sides of the stylus is substantially equal, the stylus does not cast a shadow on disc 20. It is this bulb 84 which is controlled by switch 26 (Figure 4). A similar light bulb 90 (Figure 1) is provided in liquid level 18 to illuminate the bubble, this bulb being under the control of rheostat 28 (Figure 4).

Figure 11:
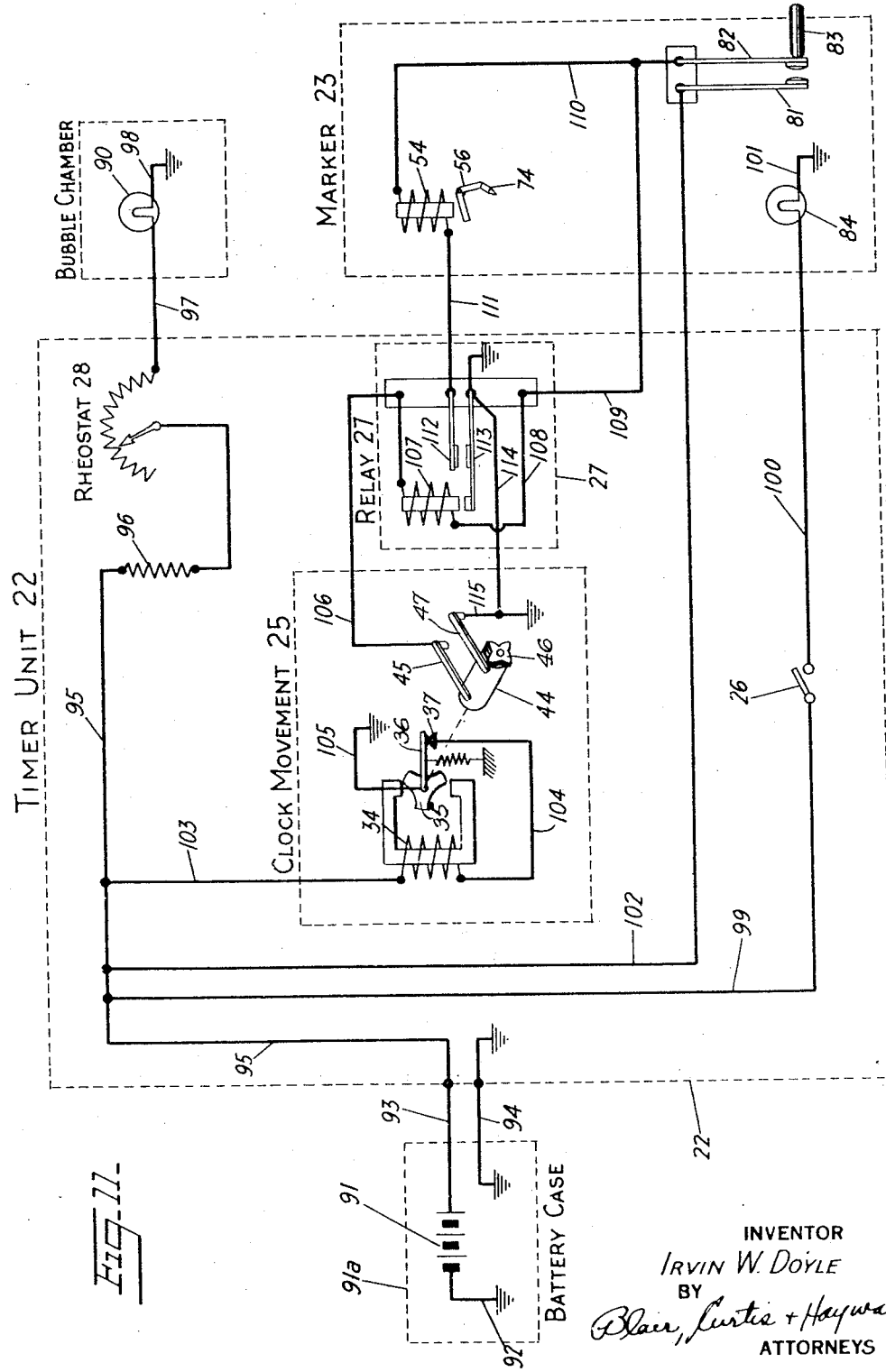

The complete operation of the automatic marking mechanism will be described in connection with Figure 11.

A source of current is provided preferably by a detached dry cell battery 91, which may conveniently be a suitable number of flashlight cells contained in a battery case 91a. Battery 91 is connected to ground by a line 92. The battery is connected to timer 22 by a cable having a pair of leads 93 and 94, the first of which goes to battery 91, and the second of which is grounded. Cable lead 93 connects with a line 95 in the timer unit which is connected through a series resistance 96 to rheostat 28, the rheostat in turn being connected by a line 97 going to one side of the bubble chamber lamp 90, the other side of this lamp being grounded by a lead 98.

A lead 99 connects line 95 with one side of switch 26, the other side of this switch being connected by a line 100 with the marker unit lamp 84, this lamp being grounded by a line 101. A second line 102 connects stationary contact 81 in marker unit 23 with line 95, while a third line 103 connects line 95 with clock movement 25. This line 103 is connected to one end of the clock movement coil 34, the other end of which is connected by a lead 104 with spring contact 37. Pin 36 which, as noted above, is carried by flywheel 35 (Figure 4) is in Figure 11 illustratively grounded by line 105. Strip or brush 45 of the clock movement is connected by a line 106 to one side of coil 107 of relay 27, the other side of this coil being connected by lines 108 and 109 to a line 110, in turn connected to movable contact 82. Line 110 is also connected to one side of the stylus solenoid coil 54, the other side of which is connected by a line 111 to the stationary contact 112 of relay 27. The movable contact 113 of relay 27 is connected by a line 114 to a line 115 which grounds contact strip 47 of electric clock movement 25 (see also Figure 4). It will now appear that when battery 91 is connected to the sextant, the following circuit is established: battery 91, cable lead 93, line 95, lead 103, clock movement coil 34, lead 104, contacts 37 and 36 and lead 105 to ground, and accordingly back to battery 91 through grounded leads 94 and 92. As noted hereinbefore, energization of coil 34 effects oscillation of flywheel 35, and accordingly rotation of drum 38. As also noted hereinabove, rotation of drum 38 and star wheel 46 intermittently connects strips 45 and 47 to create successive accurately timed impulses for the intermittent energization of marker 23, i. e. a circuit to marker 23 is intermittently closed as follows: battery 91, leads 93 and 95, lead 102, contacts 37 and 82 (assuming that the observer has depressed push button 83), lines 110, 109 and 108, relay coil 107, line 106, contact strips 45 and 47 and lead 115 to ground, and accordingly to the other side of the battery. Thus as strips 45 and 47 are intermittently connected, relay coil 107 is intermittently energized to cause intermittent engagement of contacts 112 and 113. When these contacts are engaged, the following circuit to the marker solenoid coil 54 is established: lead 110, which is connected to battery 91, as described above, coil 54, lead 111, contacts 112 and 113 to ground. Thus it may be seen that marker solenoid coil 54 is intermittently energized so that at accurately timed intervals stylus 74 is actuated to make a mark, as noted above.

Figure 5:
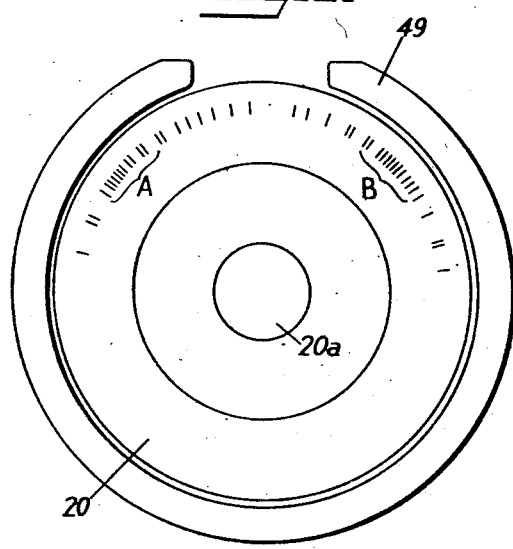
Figure 5 is a side elevation of the recording disc having marks thereon illustrative of a typical pattern or grouping resulting from the taking of a number of sights over a period of time.
Figure 6:
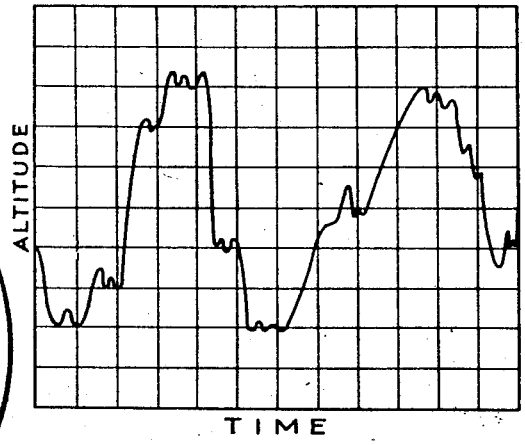
Figure 6 is a plot of altitude against time illustrative of the variation in readings taken over a period of time.

It may now be seen that when the observer is operating the sextant shown in Figure 1, he maintains push button 83 depressed to effect continuous operation of the marker as described, and at the same time manipulates knob 19 while looking through eyepiece 16, in order to bring the bubble in liquid level 17 into coincidence with the heavenly body with respect to which he is taking the sight. If the platform from which the observer is taking his sights moves, or if the observer moves while taking the sight, the bubble in the liquid level will move accordingly and hence necessitate substantially continuous back and forth adjustment of knob 19 as the observer endeavors to maintain the bubble and the heavenly body in coincidence. Thus over a period of time, the observer is in effect taking an infinite number of sights, a plot of which may take the appearance of the curve shown in Figure 6. It follows that if this curve can be divided into predetermined accurate time intervals, for example, intervals of one second, it would be possible to obtain an averaged reading which would be quite accurate. In effect, this is the result obtained by the automatic averaging mechanism hereinbefore described, by which there is marked on disc 20 a pattern, such as is shown in Figure 5. From this pattern it may be seen that there is a preponderance or grouping of marks at A and B in the upper left-hand and upper right-hand quadrants, with variously spaced stray markings therebetween and on opposite sides thereof. From this grouping the observer can estimate with reasonably accuracy that position on disc 20 which represents a reasonably accurate average, which gives him the final fix between groups A and B. If there is a preponderance of the markings adjacent one group as, for example, group A, a trained observer will know how to weight the average reading so as to obtain reasonable accuracy. Thus the observer may rotate disc 20 in one direction or the other by its knob 20a to this "averaged" position, and thereafter take a reading from indicator 21, it being remembered that disc 20 is geared to indicator 21. It follows that this "averaged" reading is obtained with the preclusion of errors otherwise entering by reason of normal psychological tendencies or reactions of the observer. Furthermore an "averaged" reading may be obtained through use of the averaging device over various periods of time. Thus the heavenly body being sighted might be visible but for thirty seconds on the one hand, or two or more minutes on the other. In either event, an average reading is obtainable, although the accuracy thereof would in all probability be better in the second case.

In Figures 7 and 8, I have shown another form of my automatic averaging and marking device. In Figure 7, the sextant comprises that portion included in the bracket 116, accordingly having body 15, eyepiece 16 (Figure 8), housing 17, liquid level 18, knob 19 and rim 49. In this form, record disc 20, as shown in the sextant of Figure 1, is replaced by a record disc 117 (Figure 7) which lies outside of rim 49, but is, however, operated in the same manner as disc 20. In other words, disc 117 rotates in one direction or the other, in accordance with the direction of manipulation of knob 19. As disc 117 rotates, it has a time-altitude curve automatically inscribed thereon by a stylus 118, in a manner now to be described. As is better shown in Figure 8, stylus 118 is mounted in one end of an arm 119, the other end of which is fastened to a post 120 pivotally mounted in the base 121 of the automatic averaging and marking device, which is generally indicated at 122. It is noted at this point that the device 122 may be secured in any suitable manner to the sextant. Coiled about post 120 is a spring 123, having one end 124 anchored to arm 119, the other end 125 of the spring being held stationary in any suitable manner. Thus the spring imparts a constant counterclockwise bias to arm 119, as viewed in Figure 8, so that when released, the arm, and accordingly stylus 118, is driven in a counterclockwise direction to inscribe a time-altitude curve. Since the movement of the stylus is a function of time, and the movement of record disc 117 is a function of altitude, the relative movements of the stylus and disc accordingly create a time-altitude curve. In order, however, to control the rate of counterclockwise movement of arm 119, the arm is connected by a gear train to a governor 126 which accordingly controls the rate of movement of the arm. To this end, there is fastened to post 120, so as to rotate therewith, a gear sector 127 which meshes with a pinion 128 fastened to the same shaft 129 as is a large gear 130. This large gear, in turn, meshes with a pinion 131 mounted on the same shaft 132 as a second large gear 133, which meshes with a pinion 134 mounted on a shaft 135. This shaft also carries a timing cam 136, as well as a large gear 137 which through a pinion 138 is connected in any suitable manner such as by suitable shafts and bevel gears (not shown) to governor 126. Thus gears 127—138 constitute a gear train between arm 119 and governor 126, by which the rate of movement of the arm is maintained at a substantially constant value.

Preferably engagement between stylus 118 and disc 117 is effected intermittently at accurately timed intervals. To this end, the stylus is preferably reciprocably mounted in a housing 140 (Figure 7) in which is disposed a small solenoid 141 by which the stylus may be intermittently reciprocated. This solenoid is included in the circuit of a pair of contacts 142 and 143 (Figure 8) which are intermittently engaged, for example, one every second, by timing cam 136. The circuit for these contacts also, of course, includes a source of power (not shown) which, as in the case of the averaging and marking device described in Figures 1-4, may conveniently be dry cell batteries contained in a carrying case. Thus it may now be seen that when arm 119 is set to its extreme clockwise position and released it will follow a substantially radial path of movement from the rim toward the center of recording disc 117 at a controlled rate, while at the same time stylus 118 will intermittently engage the record disc through the operation of timing cam 136 and contacts 142 and 143. Thus, at the end of the period of counterclockwise travel of arm 119, stylus 118 will have made a series of dots on record disc 117, which will take the form of a time-altitude curve the nature of which, of course, depends on the movement of record disc 117 in response to the manipulation of knob 19 by the observer. Thus this curve may in certain respects resemble that shown in Figure 6. In any event, the curve may be averaged visually by the observer to give him an altitude reading of the heavenly body sighted.

Figure 9:
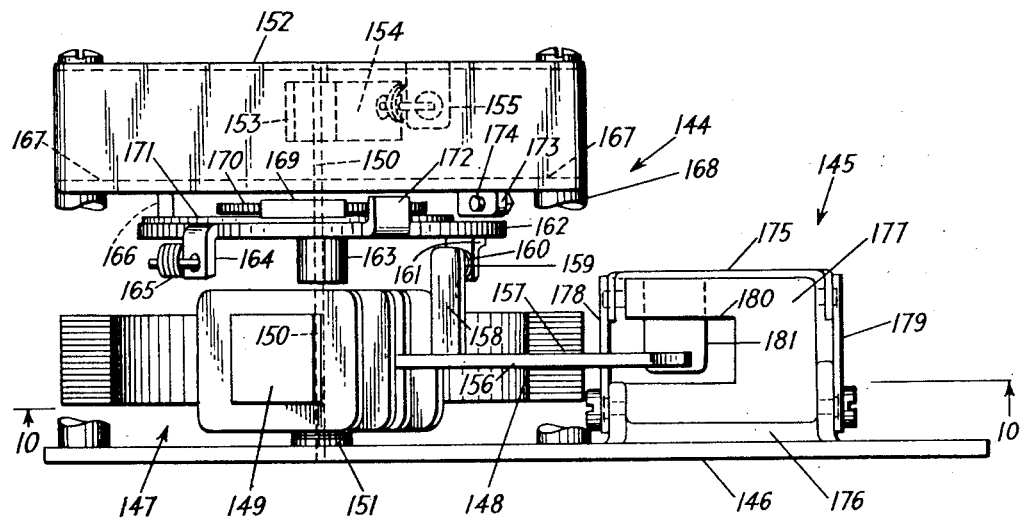
Figure 9 is an enlarged side elevation (with cover removed) of still another form of the marking device adapted to be attached to the sextant (not shown) certain portions being broken away, and others being shown in section.
Figure 10:
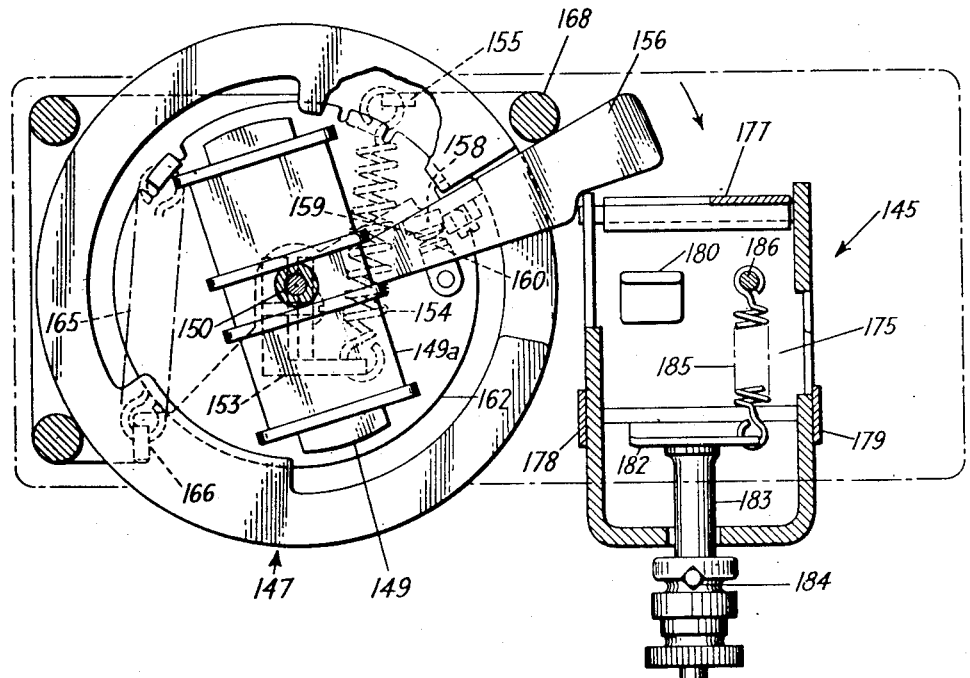
Figure 10 is a sectional view taken along the line 10—10 of Figure 9, a portion thereof being broken away; and, Figure 11 is the wiring diagram for the embodiment shown in Figures 1-4.

In Figures 9 and 10, I have shown the third form of my automatic averaging and marking device (with cover removed). In this form I have not shown the device as attached to the sextant, it being understood that it is readily so attachable as properly to present its stylus to the surface of the sextant recording disc. In Figure 9, a timing unit is generally indicated at 144, a marking unit being generally indicated at 145, both of these units being fastened to a supporting plate 146 to which the cover of the device is secured in any suitable manner. The timing unit 144 includes a reluctance motor, generally indicated at 147, comprising a two-pole laminated field magnet 148, and an oscillatable armature 149, having windings 149a. Armature 149 is secured to a shaft 150 (Figure 10), the lower end of which is rotabaly supported in a bearing 151 (Figure 9), the upper end thereof being supported in a top plate 152. A bracket 153 is fastened to the upper end of shaft 150 and has connected thereto one end of a spring 154, the other end of which is anchored in a depending lug 155 secured to top plate 152. As shown in Figure 10, spring 154 imparts a constant counterclockwise bias to armature 149, and accordingly opposes clockwise movement of the armature upon energization of motor 147.

Secured to, so as to move with armature 149 is an arm 156 extending outwardly through a slot 157 in field magnet 148 to engage and operate marker 145 when motor 147 is energized, as will be described in detail below. Fastened to and extending upwardly from arm 156 is a finger 158, the upper end of which carries a contact button 159 (see also Figure 10). This contact button is adapted to engage a contact button 160 mounted on a lug 161, secured to and depending from a plate 162. This plate is fastened to a hub or sleeve 163, which is freely mounted on shaft 150. Thus plate 162 is rotatable relative to armature 149. Plate 162 has another lug 164 depending therefrom, and to this lug is fastened one end of a spring 165, the other end of this spring being secured to a finger 166, secured to and extending downwardly from an intermediate supporting plate 167. Spring 165 (see Figure 10) imparts a constant counterclockwise bias to plate 162 to maintain contact buttons 159 and 160 in engagement, as well as forcing arm 156 against a post or stop 168.

Referring back to Figure 9, plate 162 carries a pawl 169 adapted to engage and accordingly drive a ratchet 170 during counterclockwise movement of the plate, as viewed in Figure 10. Ratchet 170 is freely mounted on shaft 150 (Figure 9) and is connected through a gear train (not shown) to a conventional escapement mechanism or governor, as desired, which not only governs the period of the counterclockwise movement of plate 162, as viewed in Figure 10, but also maintains it substantially constant. The escapement or governor may be conveniently housed between upper and intermediate plates 152 and 167. Plate 162 also carries an arcuate shaped weight 171 which increases the inertia of the plate for a purpose which will be disclosed.

As noted hereinbefore, reluctance motor 147, when energized, rotates arm 156 (Figure 10) clockwise, the arm accordingly driving the marking device 145 the limit of its travel. This limit of travel of the marking device accordingly constitutes the limit of possible movement of arm 156 and accordingly contact button 159 carried thereby. The limit of movement of plate 162, however, is determined by a pair of lugs 172 and 173 carried respectively by plate 162 and intermediate supporting plate 167. A certain amount of adjustment is provided by a set screw 174 extending through lug 173. These lugs 172 and 173 are so arranged as to permit an over-travel of plate 162 in relation to the total extent of movement of arm 156 upon energization of the reluctance motor. Inasmuch as when the motor is energized, arm 156 reacts strongly and suddenly, plate 162 (which is driven by finger 158 and lug 161, Figure 9) gains substantial momentum, by reason of inertia plate 171, which is sufficient to continue the rotation of the plate throughout the extent of over-travel of which it is capable, which over-travel effects a separation of contact buttons 159 and 160. These buttons constitute a switch in the circuit of motor 147 so that when the contact buttons are separated, the circuit to the motor is broken, effecting its deenergization and accordingly permitting immediate counterclockwise rotation of arm 156, as viewed in Figure 10, by spring 154.

When lug 172 (Figure 9) engages set screw 174 in stop lug 173 the plate spring 165 (Figure 10) starts to rotate plate 162 counterclockwise. The rate of movement of the plate, however, is controlled by the escapement or governor hereinabove referred to so that a definite period of time elapses before the plate rotates sufficiently to effect reengagement of contact buttons 159 and 160. When, however, these buttons reengage at the end of an interval of one second, for example, motor 147 is reenergized and the cycle is recommenced. Thus for each excitation of the motor, marking device 145 is driven so that its stylus, described below, makes a mark on record disc 20 (Figure 1) of the sextant.

Marker 145 conveniently includes upper and lower plates 175 and 176 pivotally connected by a rear link 177 and a pair of front links 178 and 179, the rear link 177 being slotted as at 180 for the admission of arm 156 between upper and lower plates 175 and 176 to engage a lip 181 depending from the former. To the front end of upper plate 175 (Figure 10) is secured a depending bracket 182 which carries a post 183; this post carries at its outer end a stylus or lead 184. Bracket 182 also has secured thereto one end of a spring 185, the other end of which is anchored to a post 186 secured to bottom plate 176 (Figure 9) this spring acting to return the stylus and also to assist in returning arm 156 to their Figure 10, or starting, positions, upon deenergization of the timer motor. It may now be seen that when the circuit of timer motor 147 is closed, as by a suitable manually operable on-off switch (not shown), the motor is intermittently energized through the making and breaking of contact buttons 159 and 160, as described in the preceding paragraph. This intermittent energization of the motor accordingly intermittently reciprocates stylus 184 of marker unit 145 at accurately fixed intervals, so as to mark the record disc 20 (Figure 1) of the sextant, in the manner described in connection with marker 23. While I have not shown the circuit of timer motor 147, it will be understood that this is a simple conventional circuit including the timer motor, contacts 159 and 160, a source of power and a conventional manually operable switch. Thus it follows that as long as such switch is closed, the timer motor is continuously intermittently energized so that marks are made on the record disc automatically, permitting the navigator to focus his entire attention on collimation.

Accordingly I have provided an averaging marker for a sextant, which attains the several objects set forth hereinabove in a thoroughly practical and efficient manner.

As many possible embodiments may be made of the above invention, and as many changes might be made in the embodiment above set forth, it is to be understood that all matter hereinbefore set forth or shown in the accompanying drawing is to be interpreted as illustrative and not in a limiting sense other than required by the definition of the appended claims.

I claim:

1. In apparatus for recording successive sights taken with a sextant, said apparatus comprising, the combination of, means for movably mounting a recording member, means adapted to be mounted on said sextant adjacent said movable member for making a mark thereon, an element for intermittently operating said marking means, a solenoid for driving said element, a circuit including a source of power for said solenoid, said circuit also including a pair of disengageable contacts, means mounting one of said contacts on said element, a movable part adjacent said solenoid, said other contact being mounted on said part whereby said part is driven when said solenoid is energized, means for limiting the travel of said element relative to that of said part whereby said part is capable of a total movement in excess of that of said last-mentioned element thereby to disengage said contacts and break said circuit, means for returning said solenoid to its starting position, and means for returning said element to its starting position but at a slower rate, whereby said solenoid is intermittently energized.

2. Apparatus according to claim 1 wherein said returning means includes an escapement mechanism.

3. A sextant comprising, in combination, a body and associated housing, means for mounting a record member in said housing for movement in one direction or another in accordance with the direction of adjustment of the sextant, a casing mounted on said housing adjacent said record member, a stylus mounted in said casing for making marks on said record member, illuminating means mounted in said casing, and light conducting and distributing means operatively associated with said illuminating means in said casing for conducting light therefrom to said record element on opposite sides of said stylus.

4. In apparatus of the character described, in combination, a navigating instrument, manually operable means for adjusting said instrument, recording means including a stylus on said instrument operable for recording successive instantaneous readings as the navigator adjusts the instrument, a solenoid including an armature mounted on said instrument, means connecting said stylus to said armature, and means including a switch operable by the navigator, to effect continuous intermittent energization of said solenoid and thereby intermittent recording operation of said stylus at regularly timed intervals exclusive of the navigator's control as long as the navigator keeps said switch closed to maintin energization of said solenoid.

5. Apparatus according to claim 3 wherein the light conducting and distributing means includes a pair of members so mounted adjacent said housing as to straddle said stylus.

6. Apparatus according to claim 3 wherein the light conducting and distributing means includes a pair of members so mounted adjacent said housing as to straddle said stylus, said light distributing means comprising a unitary member secured to the sextant body.

7. Apparatus according to claim 4 wherein the solenoid, armature and stylus are disposed in a housing, and means for attaching said housing to said sextant, whereby the solenoid, armature and stylus comprise a unitary assembly applicable as such to a standard sextant.

8. In apparatus of the character described, in combination, a sextant, manually operable means for adjusting said sextant, recording means including a marking device on said sextant operable for recording successive instantaneous readings as the navigator adjusts the sextant, energizable means connected to said recording means and operable during energization to effect continuous operation of said marking device, and switch means in the circuit of said energizable means for manual operation by the navigator to effect energization of said energizable means, whereby as long as the navigator holds said switch means closed said recording means operates continuously.

9. Apparatus according to claim 8, wherein said circuit includes switch means, and a source of power, said circuit also including a second switch adapted to be intermittently opened and closed, said circuit being energized when both of said switches are closed, and means operatively associated with said second switch for intermittently opening and closing it.

10. Apparatus according to claim 9, wherein the means which intermittently closes said second switch includes a clock movement, whereby said second switch is closed at regularly timed intervals.

IRVING W. DOYLE.

(References on following page)

REFERENCES CITED

The following references are of record in the file of this patent:

UNITED STATES PATENTS

| Number | Name | Date |
|---|---|---|
| 1,255,202 | Messiter | Feb. 5, 1918 |
| 1,415,499 | Tuttle | May 9, 1922 |
| 1,970,543 | Carbonara | Aug. 21, 1934 |
| 2,106,460 | Lepetit | Jan. 25, 1938 |
| 2,257,233 | Gallasch | Sept. 30, 1941 |
| 2,278,203 | Lepetit | Mar. 31, 1942 |
| 2,280,844 | Page | Apr. 28, 1942 |
| 2,340,324 | Hobbs | Feb. 1, 1944 |
| 2,349,506 | Lowkrantz et al. | May 23, 1944 |

FOREIGN PATENTS

| Number | Country | Date |
|---|---|---|
| 15,787 | Great Britain | May 9, 1922 |
| 810,260 | France | Dec. 28, 1936 |
| 853,412 | France | Dec. 7, 1939 |